US011336786B2

(12) United States Patent
Furukawa et al.

(10) Patent No.: US 11,336,786 B2
(45) Date of Patent: May 17, 2022

(54) SHEET DISCHARGING APPARATUS, SHEET PROCESSING APPARATUS, AND IMAGE FORMING SYSTEM

(71) Applicant: CANON KABUSHIKI KAISHA, Tokyo (JP)

(72) Inventors: Hitoshi Furukawa, Shizuoka (JP); Takao Izaki, Shizuoka (JP); Haruki Ishibashi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/179,581

(22) Filed: Feb. 19, 2021

(65) Prior Publication Data

US 2021/0289091 A1 Sep. 16, 2021

(30) Foreign Application Priority Data

Mar. 11, 2020 (JP) .............................. JP2020-042346

(51) Int. Cl.
*G06K 15/00* (2006.01)
*H04N 1/00* (2006.01)
*G06K 15/16* (2006.01)

(52) U.S. Cl.
CPC ..... *H04N 1/00633* (2013.01); *H04N 1/00037* (2013.01); *H04N 1/00082* (2013.01); *H04N 1/00602* (2013.01); *H04N 1/00612* (2013.01); *H04N 1/00615* (2013.01); *H04N 1/00628* (2013.01); *H04N 1/00888* (2013.01); *G06K 15/16* (2013.01)

(58) Field of Classification Search
CPC ........... H04N 1/00633; H04N 1/00636; H04N 1/00037; H04N 1/00082; H04N 1/00628; H04N 1/00888; H04N 1/00602
See application file for complete search history.

(56) References Cited

U.S. PATENT DOCUMENTS

2006/0261543 A1* 11/2006 Miyake .................. B65H 31/24 271/292
2014/0312559 A1* 10/2014 Kidoh .................... B65H 31/10 271/176
2015/0314978 A1* 11/2015 Miyajima .............. G03B 27/52 271/298

FOREIGN PATENT DOCUMENTS

| JP | H07-228413 A | 8/1995 |
| JP | 2004-001945 A | 1/2004 |
| JP | 2008-168995 A | 7/2008 |

(Continued)

Primary Examiner — Moustapha Diaby
(74) Attorney, Agent, or Firm — Venable LLP

(57) ABSTRACT

A sheet discharging apparatus includes a first stacking unit to stack a sheet discharged by a first discharge unit, a second stacking unit disposed below the first stacking unit to stack the sheet discharged by a second discharge unit, and a lifting unit to lift and lower the first and second stacking units. A detection unit changes an output value based on contact of a matter with a lower surface of the first stacking unit, and a distance estimation unit estimates a distance between the first stacking unit and the second stacking unit. A separation process lifts the first stacking unit to increase a distance between the first and second stacking units in a vertical direction in a case where the output value changes based on contact of the matter with the lower surface of the first stacking unit and the estimated distance being smaller than a threshold value.

16 Claims, 12 Drawing Sheets

(56) References Cited

FOREIGN PATENT DOCUMENTS

JP        2015-147657 A     8/2015

\* cited by examiner

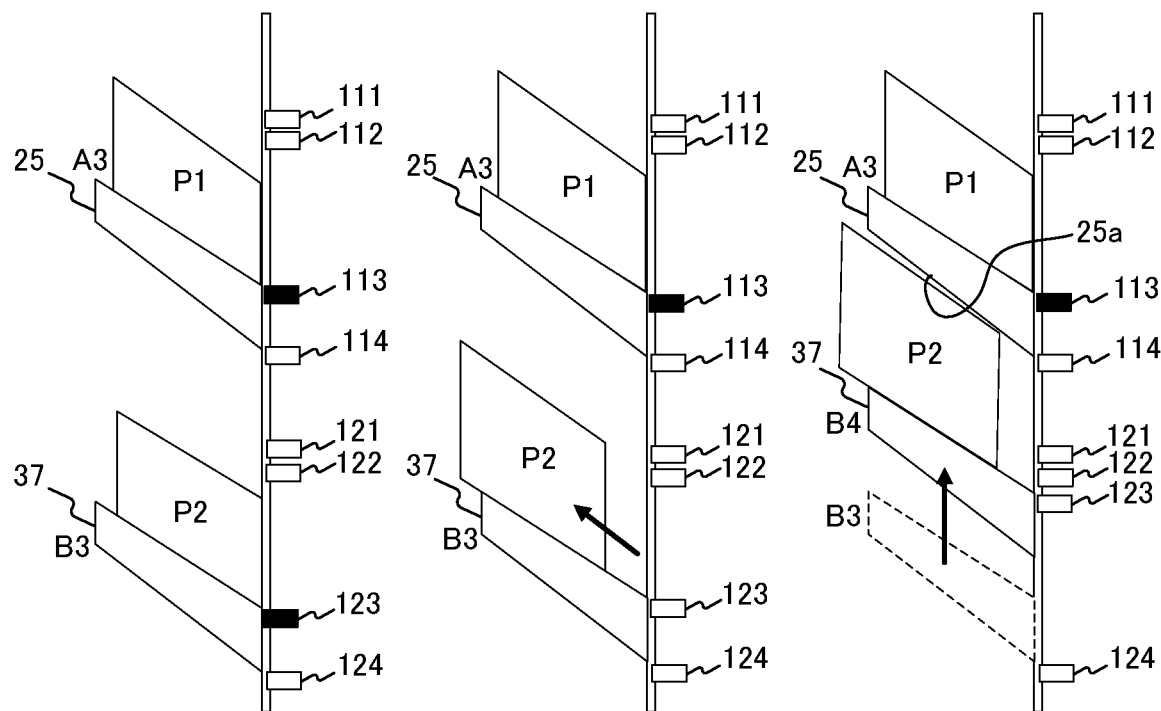
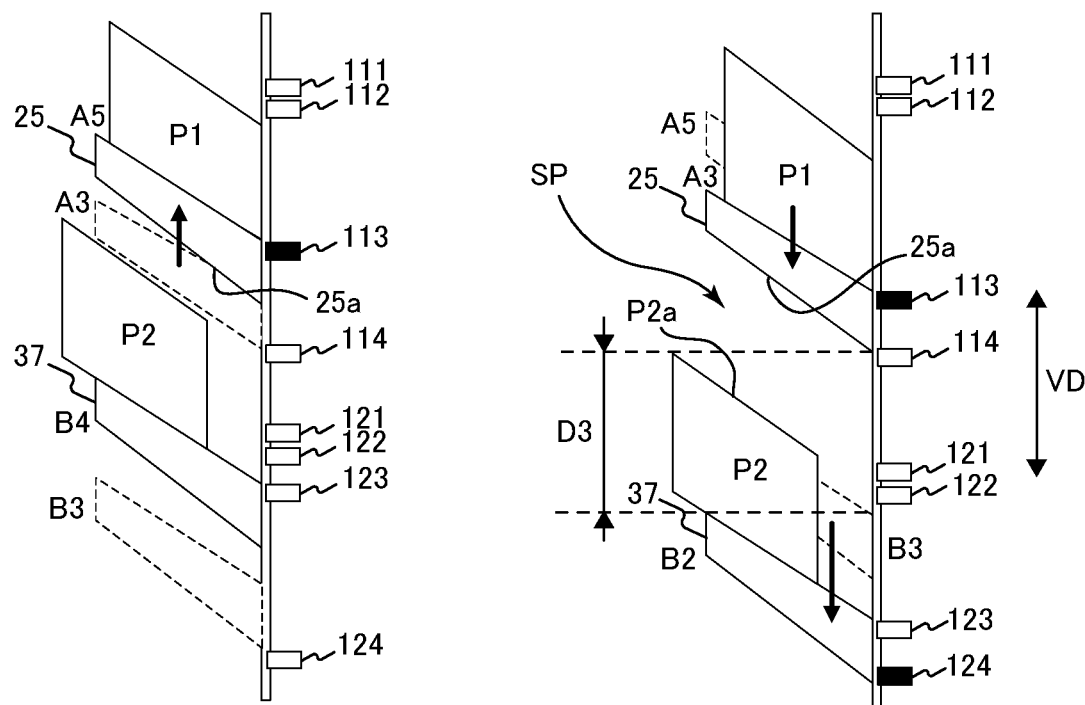
FIG.6A  FIG.6B  FIG.6C
FIG.6D  FIG.6E

SHEET DISCHARGING APPARATUS, SHEET PROCESSING APPARATUS, AND IMAGE FORMING SYSTEM

BACKGROUND OF THE INVENTION

Field of the Invention

The present invention relates to a sheet discharging apparatus which discharges a sheet, and a sheet processing apparatus and an image forming system including the sheet discharging apparatus.

Description of the Related Art

Hitherto, a post processing apparatus which includes a tray to stack a recording sheet discharged by a discharge roller and which lifts and lowers the tray depending on a height of the recording sheet stacked on the tray is suggested (refer to Japanese Patent Laid-Open No. H07-228413). This post processing apparatus detects a position of an upper surface of the recording sheet stacked on the tray by a sheet surface sensor, and adjusts a height of the tray so as to be capable of appropriately holding the recording sheet discharged by the discharge roller. Then, when the recording sheet stacked on the tray has been taken out, so as to receive the recording sheet to be discharged next, the tray is lifted to a predetermined position adjacent to a discharge port.

In recent years, to enhance user's convenience, the post processing apparatus having a plurality of trays arranged in parallel in a vertical direction is desired. For example, in the post processing apparatus having an upper and a lower tray, in a case where the upper tray is fully stacked with the discharged recording sheet, the upper tray is being lowered to a lower limit position. At this time, if it takes much time to take out the recording sheet from the lower tray, since the lower tray is lifted, a space to take out the recording sheet narrows, and there is difficulty in taking out the recording sheet.

SUMMARY OF THE INVENTION

According to one aspect of the present invention, a sheet discharging apparatus includes a first discharge unit and a second discharge unit configured to discharge a sheet respectively, a first stacking unit configured to stack the sheet discharged by the first discharge unit, a second stacking unit disposed below the first stacking unit, and configured to stack the sheet discharged by the second discharge unit, a lifting unit configured to lift and lower the first and second stacking units, and a control unit configured to perform a separation process of moving at least one of the first and second stacking units so as to increase a distance between the first and second stacking units in a vertical direction in a case where a matter has come into contact with a lower surface of the first stacking unit and a distance between the sheet stacked on the second stacking unit and the lower surface of the first stacking unit is smaller than a threshold value.

Further features of the present invention will become apparent from the following description of exemplary embodiments with reference to the attached drawings.

BRIEF DESCRIPTION OF THE DRAWINGS

FIG. 6A is a diagram showing a state where a predetermined amount of the sheet bundle is stacked on each tray.

FIG. 6B is a diagram showing a state where the sheet bundle is being taken out from the lower discharge tray.

FIG. 6C is a diagram showing a state where the sheet bundle stacked on the lower discharge tray comes into contact with the lower surface of the upper discharge tray.

FIG. 6D is a diagram showing a first ascending process which lifts the upper discharge tray.

FIG. 6E is a diagram showing a first descending process which lowers the upper and lower discharge trays.

DESCRIPTION OF THE EMBODIMENTS

First Embodiment

General Configuration

Figure 1:
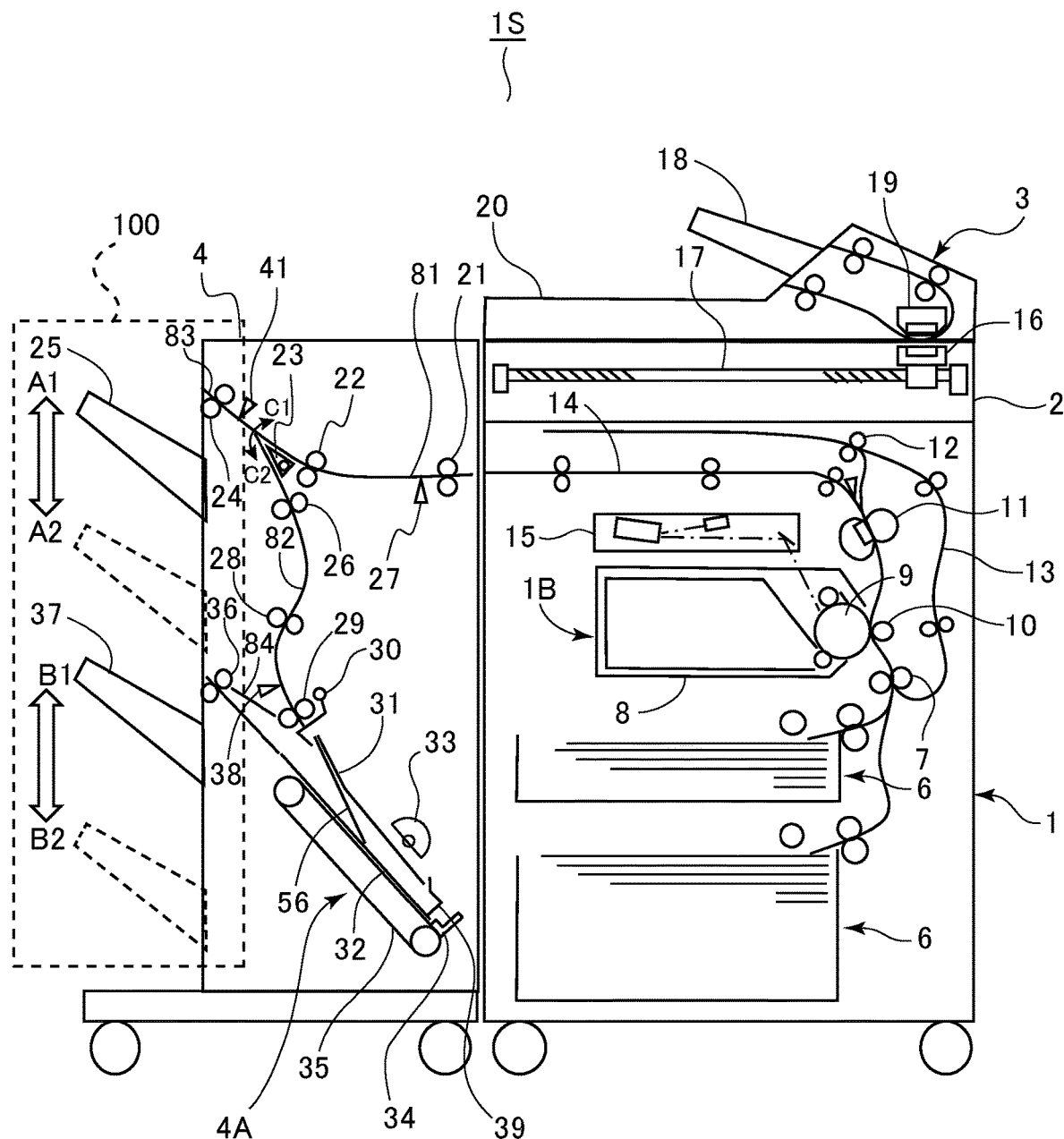
FIG. 1 is a diagram showing a schematic general view of a printer according to a first embodiment.

As shown in FIG. 1, an image forming system 1S according to a first embodiment includes an image forming apparatus 1, an image reading apparatus 2, a document feeding apparatus 3, and a sheet processing apparatus 4. The image forming system 1S forms an image on a sheet which is a recording material, and outputs the sheet after performing processes by the sheet processing apparatus 4 as needed.

Hereinafter, having described movement of each apparatus simply, the sheet processing apparatus 4 will be described in detail.

The document feeding apparatus 3 feeds a document placed on a document tray 18 to image reading units 16 and 19. Each of the image reading units 16 and 19 is an image sensor which reads image information from a surface of the document, and both surfaces of the document are read by feeding the document once. The document whose image information has been read is discharged to a document discharge portion 20. Further, by reciprocally moving the image reading unit 16 by a drive unit 17, the image reading apparatus 2 is capable of reading the image information from a standstill document (including the document, such as a booklet document, for which the document feeding apparatus 3 is unusable) placed on document placing table glass.

The image forming apparatus 1 is an electrophotographic unit with an image forming unit 1B of a direct transfer system. The image forming unit 1B includes a cartridge 8 having a photosensitive drum 9, and a laser scanner unit 15 disposed above the cartridge 8. In a case where an image forming operation is to be performed, a surface of the rotating photosensitive drum 9 is charged, and an electrostatic latent image is written on the surface of the drum by the laser scanner unit 15 which exposes the photosensitive drum 9 based on the image information. The electrostatic latent image carried on the photosensitive drum 9 is developed to a toner image by charged toner particles, and the toner image is conveyed to a transfer portion where the photosensitive drum 9 and a transfer roller 10 are facing each other. A controller of the image forming apparatus 1 performs the image forming operation based on the image information read by the image reading units 16 and 19 or the image information received from an outside computer via a network.

The image forming apparatus 1 includes a plurality of feeding units 6 to feed the sheet, which is the recording material, one by one at predetermined intervals. After a skew of the sheet fed by the feeding units 6 has been corrected by a registration roller pair 7, the sheet is conveyed to the transfer portion, and the toner image carried on the photosensitive drum 9 is transferred to the sheet at the transfer portion. A fixing unit 11 is disposed downstream of the transfer portion in a sheet conveyance direction. The fixing unit 11 includes a rotary member pair, which nips and conveys the sheet, and a heating element, such as a halogen lamp, which heats the toner image, and performs a fixing process of the image by heating and pressing the toner image on the sheet.

In a case where the sheet on which an image formation has been performed is to be discharged outside the image forming apparatus 1, the sheet passed through the fixing unit 11 is conveyed to the sheet processing apparatus 4 via a horizontal conveyance unit 14. In a duplex printing, in a case of the sheet on which the image formation on a first surface has been completed, the sheet passed through the fixing unit 11 is delivered to a reverse roller pair 12, and conveyed by the reverse roller pair 12 in a manner of switch-back conveyance, and conveyed to the registration roller pair 7 again via a re-conveyance unit 13. Then, after the image has been formed on a second surface of the sheet by conveying the sheet to pass through the transfer portion and the fixing unit 11 again, the sheet is conveyed to the sheet processing apparatus 4 via the horizontal conveyance unit 14.

The image forming unit 1B described above is an example of the image forming unit which forms the image on the sheet, and it is acceptable to use an electrophotographic unit of an intermediate transfer system which transfers the toner image formed on a photosensitive member to the sheet via an intermediate transfer member. Further, it is acceptable to use a printing unit of an ink jet system or an offset printing system for the image forming unit.

Sheet Processing Apparatus

In the sheet processing apparatus 4, as conveyance paths to convey the sheet, a receiving path 81, an internal discharge path 82, a first discharge path 83, and a second discharge path 84 are provided, and, as discharge destinations to discharge the sheet, an upper discharge tray 25 and a lower discharge tray 37 are provided. The lower discharge tray 37 is disposed below the upper discharge tray 25. The receiving path 81, serving as a first conveyance path, is a conveyance path which receives and guides the sheet sent from the image forming apparatus 1. The internal discharge path 82, serving as a second conveyance path, is disposed below the receiving path 81, and is a conveyance path which receives the sheet from the receiving path 81 and guides the sheet toward an alignment unit 4A. The first discharge path 83 is a conveyance path which discharges the sheet to the upper discharge tray 25, and the second discharge path 84, serving as a third conveyance path, is a conveyance path which extends toward a bundle discharge roller pair 36 from an intermediate stacking unit 39 and guides the sheet to the bundle discharge roller pair 36.

The sheet discharged from the horizontal conveyance unit 14 of the image forming apparatus 1 is received by an inlet roller pair 21, which serves as a conveyance unit disposed on the receiving path 81, and is conveyed to a before-inversion roller pair 22 via the receiving path 81. An inlet sensor 27 which changes an output value (such as a voltage value and an output signal) based on presence and absence of the sheet at a detecting position between the inlet roller pair 21 and the before-inversion roller pair 22 is provided on the receiving path 81. The before-inversion roller pair 22 conveys the sheet received from the inlet roller pair 21 to the first discharge path 83.

To be noted, it is acceptable to set a sheet conveyance speed by the inlet roller pair 21 larger than the sheet conveyance speed by the horizontal conveyance unit 14, and accelerate the sheet conveyance speed after the inlet roller pair 21 have received the sheet. In this case, it is suitable that, by providing a one-way clutch between conveyance rollers of the horizontal conveyance unit 14 and a motor which drives the conveyance rollers, the conveyance rollers are configured to idle in a case where the sheet is dragged by the inlet roller pair 21.

In a case where the discharge destination of the sheet is the upper discharge tray 25, serving as a first stacking unit, the sheet is guided to the first discharge path 83 by a guide member 23 disposed at a branch portion of the receiving path 81 and the internal discharge path 82. On the first discharge path 83, an inverse roller pair 24, serving as a first discharge unit, is provided, and the inversion roller pair 24 discharges the sheet received from the before-inversion roller pair 22 to the upper discharge tray 25.

In a case where the discharge destination of the sheet is the lower discharge tray 37, serving as a second stacking unit, the inversion roller pair 24, serving as an inversion unit, carries out a switch-back conveyance by inverting the sheet received from the before-inversion roller pair 22, and conveys the sheet to the internal discharge path 82. In particular, in a state where the guide member 23 has pivoted in a C2 direction, the sheet is guided to the first discharge path 83.

Then, when a trailing edge of the sheet has passed through an inversion sensor 41, the inversion roller pair 24 reverses rotation, and the guide member 23 pivots in a C1 direction. Herewith, the sheet is conveyed to the internal discharge path 82. That is, the internal discharge path 82 guides the sheet in a direction opposite to a direction in which the sheet is guided in the receiving path 81.

As rotary member pairs disposed on the internal discharge path 82, an internal discharge roller pair 26, an internal conveyance roller pair 28, and a kick-out roller pair 29 convey the sheet received from the inversion roller pair 24 to the alignment unit 4A while receiving and delivering the sheet in sequence. A before-intermediate stacking sensor 38 detects the sheet at a position between the internal conveyance roller pair 28 and the kick-out roller pair 29. For the inlet sensor 27, the before-intermediate stacking sensor 38, and the inversion sensor 41, for example, an optical sensor which uses light to detect the presence and absence of the sheet at a detecting position and a flag sensor which uses a flag to be pressed on the sheet are used.

The alignment unit 4A, serving as a processing unit, includes a bundle pressing flag 30, the intermediate stacking unit 39, serving as a third stacking unit, a bundle discharge guide 34, and a driving belt 35, and performs an alignment process of the sheet. The intermediate stacking unit 39 consists of an intermediate upper guide 31 and an intermediate lower guide 32, and stacks a plurality of the sheets as a sheet bundle. The sheet bundle discharged to the intermediate stacking unit 39 by the kick-out roller pair 29, which consists of a pair of rollers, is pressed on the intermediate lower guide 32 by the bundle pressing flag 30.

Then, the sheet bundle discharged to the intermediate stacking unit 39 is guided downwards along the intermediate lower guide 32, and abuts on a longitudinal alignment plate provided at a downstream edge of the intermediate stacking unit 39 in the sheet conveyance direction by a half-moon roller 33. Further, the sheet bundle aligned in the sheet conveyance direction by the longitudinal alignment plate is aligned in a width direction orthogonally intersecting with the sheet conveyance direction by a lateral alignment plate, not shown. To be noted, a conveyance pressure of the half-moon roller 33 is set at a pressure so as to slip on the sheet bundle which has been aligned and stacked on the intermediate stacking unit 39.

After the alignment process has been performed as described above, the sheet bundle is provided with a binding process by, for example, a stapler, not shown. Then, the sheet bundle is pushed out by the bundle discharge guide 34 fixed to the driving belt 35, and delivered to the bundle discharge roller pair 36 via the second discharge path 84. The sheet bundle is discharged outside the apparatus by the bundle discharge roller pair 36, serving as a second discharge unit, and stacked on the lower discharge tray 37.

Both of the upper discharge tray 25 and the lower discharge tray 37 are movable in a vertical direction with respect to a casing of the sheet processing apparatus 4. The sheet processing apparatus 4 includes sheet surface detection sensors which detect positions of upper surfaces of the sheets (stacking height of the sheet) on the upper discharge tray 25 and the lower discharge tray 37, and, when any of the sensors detects the sheet, a corresponding tray is lowered. Further, when the sheet on the upper discharge tray 25 or the lower discharge tray 37 has been taken out, the corresponding tray is lifted. Accordingly, an ascent and descent of the upper discharge tray 25 and the lower discharge tray 37 are controlled so as to keep positions of the upper surfaces of the sheets stacked on the trays at constant with respect to discharge ports to which the sheet is discharged.

Control System

Figure 2:
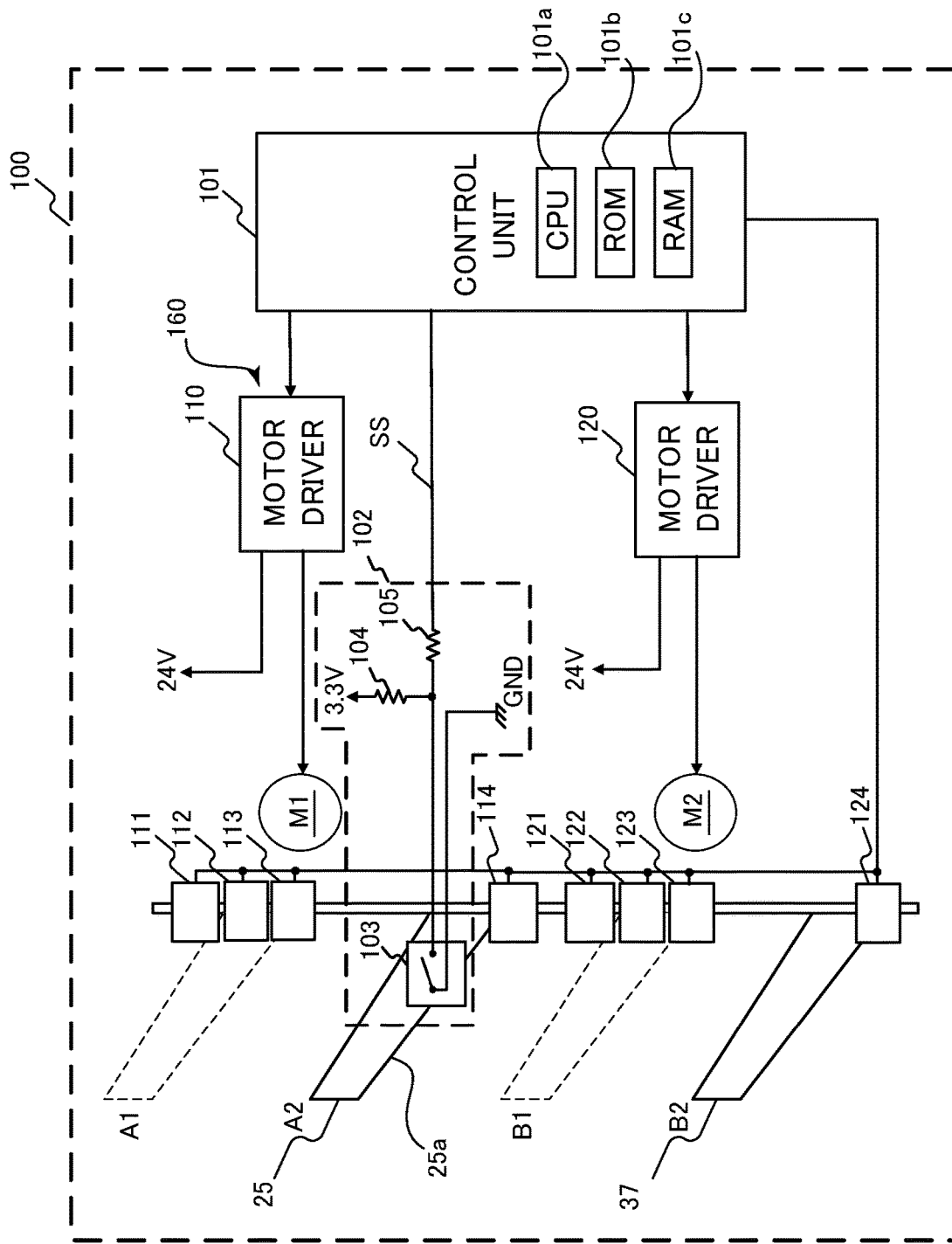
FIG. 2 is a block diagram showing a control system according to the first embodiment.

FIG. 2 is a block diagram showing a control system of a sheet discharging apparatus 100 (refer to FIG. 1) of the sheet processing apparatus 4. The sheet discharging apparatus 100 includes a control unit 101, motor drivers 110 and 120, and motors M1 and M2. The control unit 101 includes a central processing unit (CPU) 101a, which is a central arithmetic operation unit, a read only memory (ROM) 101b, which stores various programs, and a random-access memory (RAM) 101c, which is used for a workspace of the CPU 101a and a storage area of temporary data.

The motors M1 and M2, for example, consist of a stepping motor, and, while a moving distance is determined depending on a clock number transmitted from the control unit 101 via the motor drivers 110 and 120, a moving speed is determined depending on a clock frequency. An electric power is supplied to the motor M1 from 24 volt (V) power source via the motor driver 110, and the electric power is supplied to the motor M2 from 24 V power source via the motor driver 120. The motor drivers 110 and 120 and the motors M1 and M2 constitute a lifting unit 160 which lifts and lowers the upper discharge tray 25 and the lower discharge tray 37.

The motor M1, serving as a first driving source, lifts and lowers the upper discharge tray 25 via a power transmission mechanism such as a gear, not shown, and the motor M2, serving as a second driving source, also lifts and lowers the lower discharge tray 37 via a power transmission mechanism such as a gear, not shown.

To the control unit 101, upper limit sensors 111 and 121, full stack sensors 112 and 122, sheet presence/absence detection sensors 113 and 123, and lower limit sensors 114 and 124 are coupled. The upper limit sensors 111 and 121 respectively detect when the upper discharge tray 25 and the lower discharge tray 37 are positioned at upper limit positions. The full stack sensors 112 and 122 respectively detect when the upper discharge tray 25 and the lower discharge tray 37 are in full stack states. The full stack state is a state where the tray is fully stacked with the sheet and unable to stack the sheet additionally. The sheet presence/absence detection sensors 113 and 123 respectively detect whether or not the sheets are stacked on the upper discharge tray 25 and the lower discharge tray 37.

The lower limit sensors 114 and 124 respectively detect when the upper discharge tray 25 and the lower discharge tray 37 are positioned at lower limit positions. For example, the upper limit position B1 as an upper position of the lower discharge tray 37 is the upper limit position to which the lower discharge tray 37 is able to ascend, and at which the lower discharge tray 37, with no sheet being stacked, is capable of stacking the sheet discharged from the inversion roller pair 24. The lower limit position B2 as a lower position of the lower discharge tray 37 is lower than the upper limit position B1, and is the lower limit position to which the lower discharge tray 37 is able to descend. As described above, the lower discharge tray 37 is capable of ascending and descending between the upper limit position B1 and the lower limit position B2, and the upper discharge tray 25 is capable of ascending and descending between the upper limit position A1 and the lower limit position A2.

For these upper limit sensors 111 and 121, full stack sensors 112 and 122, sheet presence/absence detection sensors 113 and 123, and lower limit sensors 114 and 124, for example, an optical sensor such as a transmissive type photo-interrupter and a flag sensor using a mechanical flag are used.

Further, to the control unit 101, a detection unit 102 which changes the output value based on a detection result that the sheet stacked on the lower discharge tray 37 comes into contact with a lower surface 25a of the upper discharge tray 25 is coupled, and the detection unit 102 includes a switch 103 and resistors 104 and 105. To be noted, the detection unit 102 changes the output value based on a detection result that a matter, not limited to the sheet stacked on the lower discharge tray 37, comes into contact with the lower surface 25a of the upper discharge tray 25. The matter includes, for example, the sheet and a hand of a person. The switch 103 is capable of being switched by a mechanical flag, not shown, between an ON state which is a conducting state and an OFF state which is a non-conducting state. The switch 103 and the mechanical flag, not shown, are disposed on the lower surface 25a of the upper discharge tray 25.

In a case where the hand of the person or the sheet does not touch on the lower surface 25a of the upper discharge tray 25, the switch 103 becomes the OFF state, and in a case where the hand of the person or the sheet touches on the lower surface 25a of the upper discharge tray 25, the switch 103 becomes the ON state. A first end of the switch 103 is coupled to ground (GND). A first end of the resistor 104 is coupled to 3.3 V power source, and a second end of the resistor 104 is coupled to the switch 103 and the resistor 105. A first end of the resistor 105 is coupled to the control unit 101 via a signal SS.

In a case where the switch 103 is in the OFF state, since an electrical current flows to the control unit 101, the signal SS becomes 3.3 V. In a case where the switch 103 is in the ON state, since the electrical current flows to the ground, the signal SS becomes 0 V. Based on a switch of the signal SS from 3.3 V to 0 V, the control unit 101 judges that the hand of the person or the sheet touches on the lower surface 25a of the upper discharge tray 25.

Movement at Taking Out of Sheet

Figures 3A, 3B, 3C:
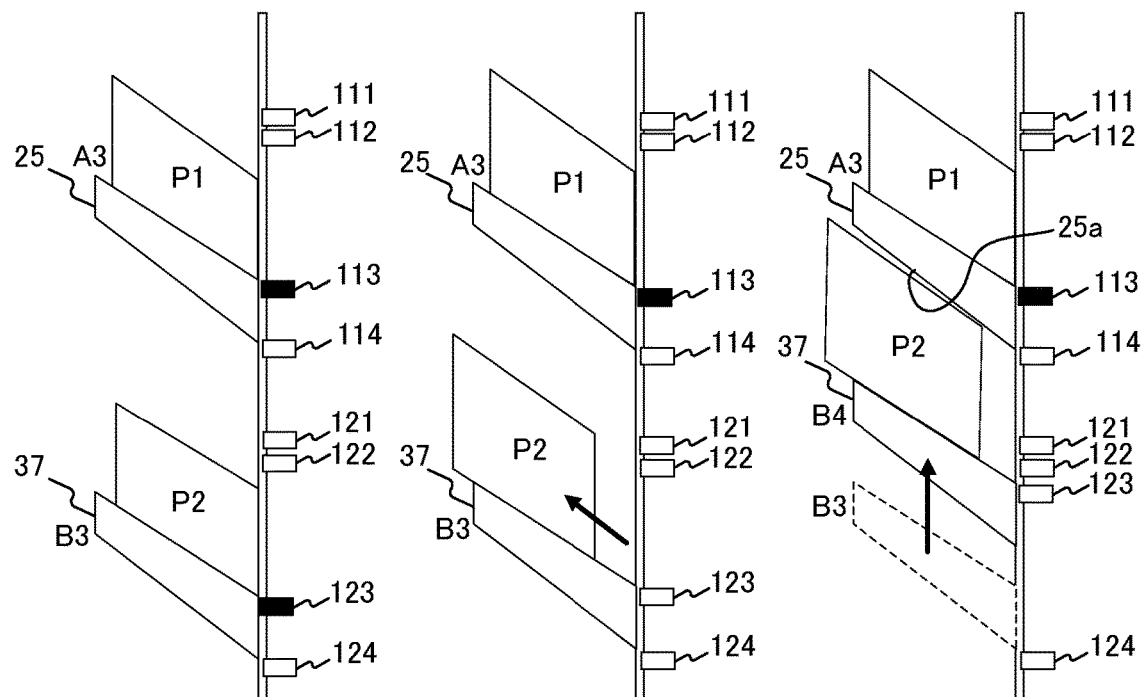
FIG. 3A is a diagram showing a state where a predetermined amount of a sheet bundle is stacked on each tray.
FIG. 3B is a diagram showing a state where the sheet bundle is being taken out from a lower discharge tray.
FIG. 3C is a diagram showing a state where the sheet bundle stacked on the lower discharge tray comes into contact with a lower surface of an upper discharge tray.

Next, movement of the sheet discharging apparatus 100 at a time when the sheet stacked on the lower discharge tray 37 has been taken out will be described. As shown in FIG. 3A, for example, in a case where a predetermined amount of the sheet bundle P1 is stacked on the upper discharge tray 25, the upper discharge tray 25 is positioned at a position A3. Further, for example, in a case where a predetermined amount of the sheet bundle P2 is stacked on the lower discharge tray 37, the lower discharge tray 37 is positioned at a position B3. As described above, depending on the amount of the sheet bundles, the upper discharge tray 25 and the lower discharge tray 37 are controlled to keep the positions of the upper surfaces of the sheet bundles stacked on the trays with respect to the discharge ports.

Even in a case where a curled sheet is discharged from the inversion roller pair 24, the upper discharge tray 25 is capable of stacking the sheet at the position A3. Even in a case where the curled sheet is discharged from the bundle discharge roller pair 36, the lower discharge tray 37 is capable of stacking the sheet at the position B3.

Hereinafter, the movement of the control unit 101 performed in a case where the sheet bundle stacked on the lower discharge tray 37 in a state shown in FIG. 3A has been taken out will be described along a flowchart shown in FIG. 4. To be noted, in the following description, the control unit 101 respectively controls the motors M1 and M2 to perform an ascent and descent of the upper discharge tray 25 and the lower discharge tray 37.

Figure 4:
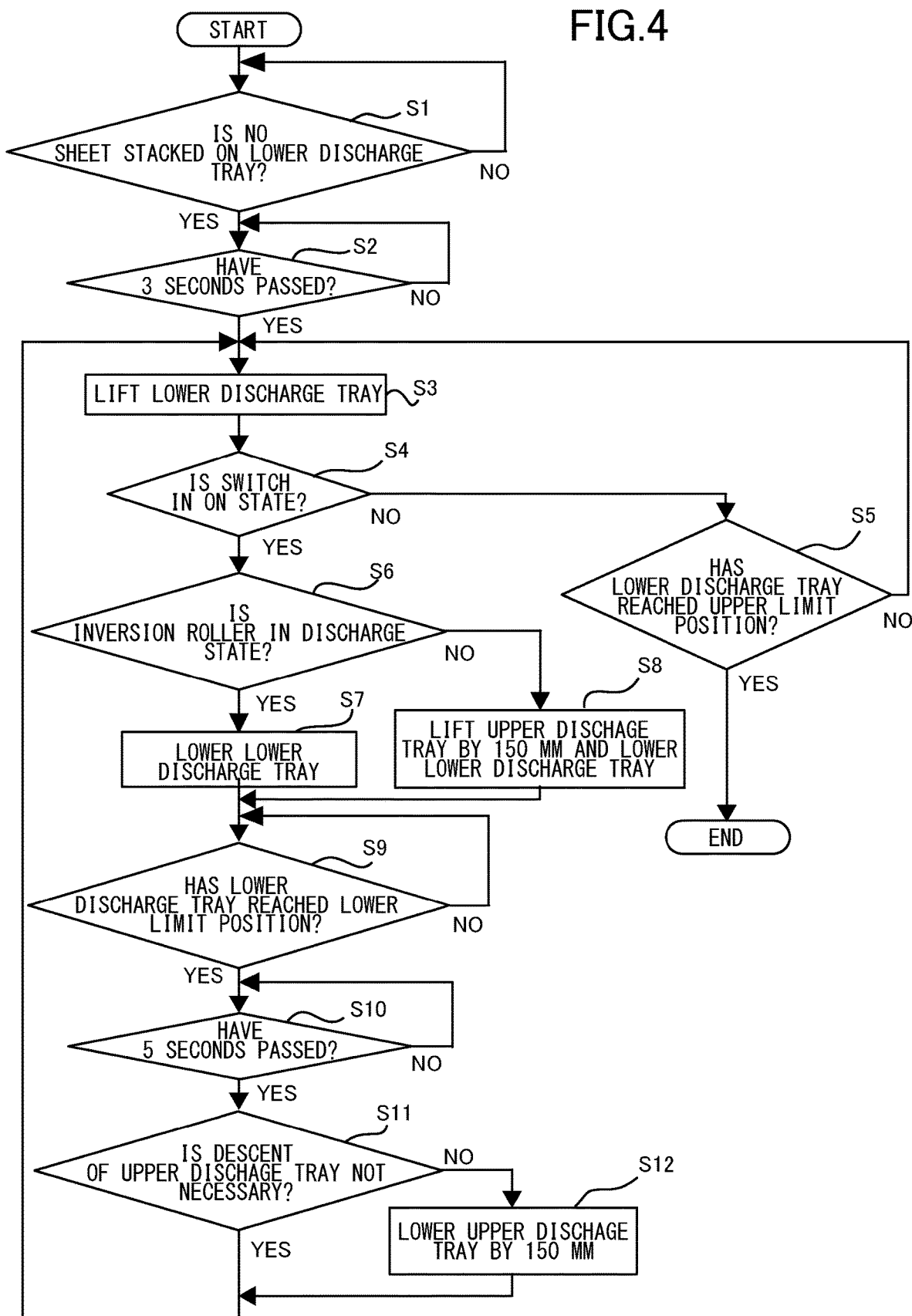
FIG. 4 is a flowchart showing processes performed at a time when the sheet bundle has been taken out from the lower discharge tray.

As shown in FIG. 4, based on detection results of the full stack sensor 122 and the sheet presence/absence detection sensor 123, the control unit 101 judges whether or not the sheet is stacked on the lower discharge tray 37 (STEP S1). For example, as shown in FIG. 3B, when the sheet bundle P2 on the lower discharge tray 37 is taken out, it is judged that the sheet is not stacked on the lower discharge tray 37.

In a case where the sheet is judged to be not stacked on the lower discharge tray 37 (STEP S1: YES), the control unit 101 judges whether or not 3 seconds to securely take out the sheet bundle P2 have passed (STEP S2). To be noted, although, in this embodiment, 3 seconds are secured at STEP S2 as an amount of time to take out the sheet bundle P2, it is not limited to this, and acceptable to change the amount of the time to take out the sheet bundle.

In a case where 3 seconds have passed (STEP S2: YES), it is regarded that the sheet bundle P2 has been taken out from the lower discharge tray 37, and the control unit 101 lifts the lower discharge tray 37 toward the upper limit position B1 (STEP S3). Then, the control unit 101 judges whether or not the switch 103 is in the ON state (STEP S4). In a case where the switch 103 is not in the ON state (STEP S4: NO), the control unit 101 judges whether or not the lower discharge tray 37 has reached the upper limit position B1 (STEP S5).

In a case where the lower discharge tray 37 is judged to have reached the upper limit position B1 (STEP S5: YES), the control unit 101 stops the lower discharge tray 37, and ends the processes. In a case where the lower discharge tray 37 is judged not to have reached the upper limit position B1 (STEP S5: NO), the control unit 101 returns to STEP S3.

As shown in FIG. 3C, in a case where the switch 103 is turned into the ON state (STEP S4: YES) by contact of the sheet bundle P2 with the lower surface 25a of the upper discharge tray 25 while the lower discharge tray 37 is being lifted, the control unit 101 proceeds to STEP S6.

For example, as shown in FIGS. 3B and 3C, in a case where the sheet bundle P2 is still stacked on the lower discharge tray 37 after having taken out the sheet bundle P2 by the predetermined distance from the lower discharge tray 37, it is occurred that the sheet bundle P2 comes into contact with the lower surface 25a of the upper discharge tray 25. Further, it is occurred that the switch 103 is turned into the ON state since the hand of a user, who holds the sheet bundle P2 intending to take out the sheet bundle P2 from the upper discharge tray 25, comes into contact with the lower surface 25a.

To be noted, a position where the lower discharge tray 37 is positioned at a time when the switch 103 is turned into the ON state is referred to as a contact position B4. At STEP S6, the control unit 101 judges whether or not the inversion roller pair 24 is in a discharge state of discharging the sheet to the upper discharge tray 25 (STEP S6).

Figures 3D, 3E:
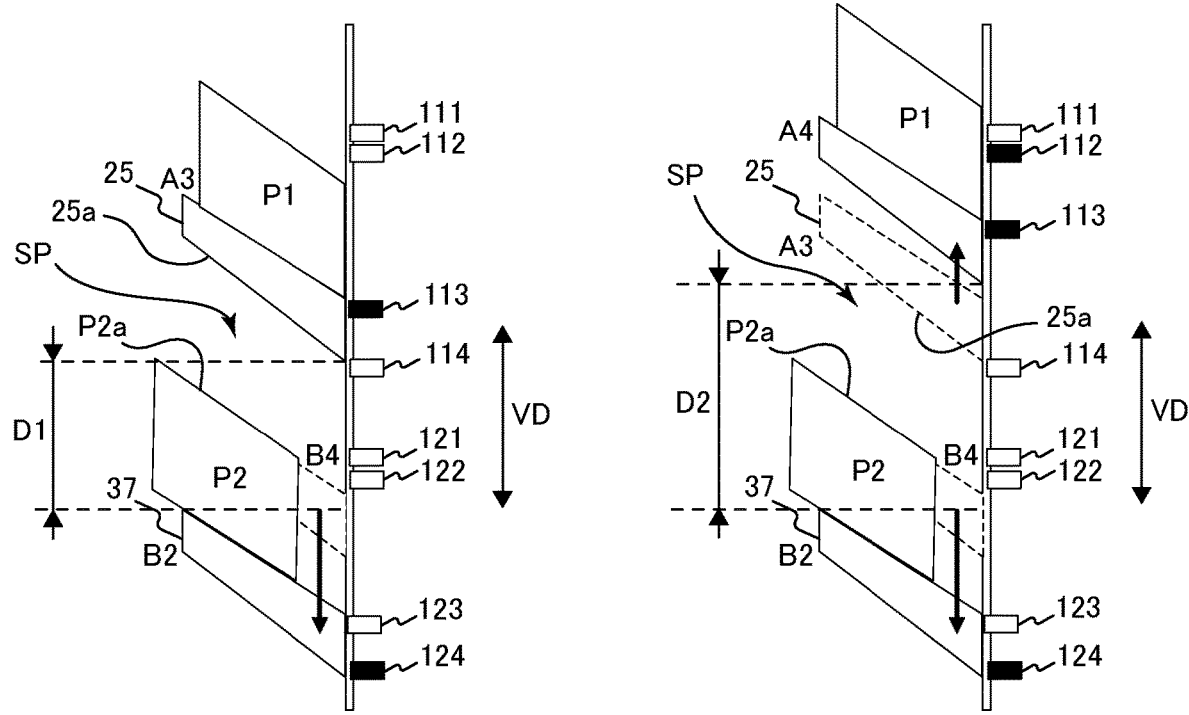
FIG. 3D is a diagram showing a descending process which lowers the lower discharge tray.
FIG. 3E is a diagram showing an ascending/descending process which lowers the lower discharge tray while lifting the upper discharge tray.

In a case where the inversion roller pair 24 is in the discharge state (STEP S6: YES), the control unit 101, as shown in FIG. 3D, performs a descending process of lowering the lower discharge tray 37 from the contact position B4 to the lower limit position B2 without lifting and lowering the upper discharge tray 25 (STEP S7).

Herewith, a distance D1 between the upper discharge tray 25 and the lower discharge tray 37 in a vertical direction VD is increased, and space SP between an upper surface P2a of the sheet bundle P2 on the lower discharge tray 37 and the lower surface 25a of the upper discharge tray 25 is widened.

Therefore, the user is able to put the hand into the space SP easily, and it is possible to facilitate a work to take out the sheet bundle P2 stacked on the lower discharge tray 37. Further, since the upper discharge tray 25 is not ascended nor descended, the upper discharge tray 25 is able to stack the sheet discharged by the inversion roller pair 24 well, and keep a capability to stack the sheet satisfactorily.

In a case where the inversion roller pair 24 is in a non-discharge state, which is not the discharge state (STEP S6: NO), the control unit 101, as shown in FIG. 3E, performs an ascending/descending process of lifting the upper discharge tray 25 and lowering the lower discharge tray 37 (STEP S8). In this ascending/descending process, the upper discharge tray 25 is lifted by as much as 150 mm, and is moved from the position A3 to a position A4. Further, in the ascending/descending process, the lower discharge tray 37 is lowered toward the lower limit position B2 from the contact position B4.

Herewith, a distance D2 between the upper discharge tray 25 and the lower discharge tray 37 in the vertical direction VD is increased, and the space SP between the upper surface P2a of the sheet bundle P2 on the lower discharge tray 37 and the lower surface 25a of the upper discharge tray 25 is widened larger. Therefore, the user is able to put the hand into the space SP easily, and it is possible to facilitate the work to take out the sheet bundle P2 stacked on the lower discharge tray 37.

Next, the control unit 101 judges whether or not the lower discharge tray 37 has reached the lower limit position B2 (STEP S9). In a case where the lower discharge tray 37 has reached the lower limit position B2 (STEP S9: YES), the control unit 101 judges whether or not 5 seconds to securely take out the sheet bundle P2 from the lower discharge tray 37 have passed (STEP S10). To be noted, although, in this embodiment, 5 seconds are secured at STEP S10 as the amount of the time to take out the sheet bundle P2, it is not limited to this, and it is acceptable to change the amount of the time to take out the sheet bundle.

In a case where 5 seconds have passed (STEP S10: YES), the control unit 101 judges whether or not a descent of the upper discharge tray 25 is necessary (STEP S11). Since the upper discharge tray 25 was not lifted in a case where the descending process was performed at STEP S7, it is judged that the descent of the upper discharge tray 25 is not necessary (STEP S11: YES), and the control unit 101 returns to the STEP S3.

In a case where the descending process was performed at STEP S8, since the upper discharge tray 25 was lifted, it is judged that the descent of the upper discharge tray 25 is necessary (STEP S11: NO), and the control unit 101 proceeds to STEP S12. The control unit 101 lowers the upper discharge tray 25 by as much as 150 mm (STEP S12), and returns to STEP S3. That is, the upper discharge tray 25 is moved to a position prior to execution of the ascending/descending process at STEP S8.

As described above, in this embodiment, in a case where the switch 103 is turned into the ON state by the contact of the sheet bundle P2 with the lower surface 25a of the upper discharge tray 25 while the lower discharge tray 37 is being lifted, the control unit 101 performs following processes. That is, in a case where the inversion roller pair 24 is in the discharge state, only the lower discharge tray 37 is lowered, and, in a case where the inversion roller pair 24 is in the non-discharge state, the upper discharge tray 25 is lifted, and the lower discharge tray 37 is lowered. In other words, so as to increase the distance (D1, D2) between the upper discharge tray 25 and the lower discharge tray 37, a separation process of moving at least one of the upper discharge tray 25 and the lower discharge tray 37 is executed. The separation process corresponds to STEPS S4 to S9 in FIG. 4.

Therefore, the user is able to put the hand into the space SP easily, and it is possible to facilitate the work to take out the sheet bundle P2 or the sheet stacked on the lower discharge tray 37.

To be noted, although, in this embodiment, the upper discharge tray 25 is lifted by as much as 150 mm at STEP S8, it is not limited to this. For example, it is acceptable to lift the upper discharge tray 25 by an appropriate distance, so that the upper discharge tray 25 is positioned above the position A3 and below the upper limit A1. On the other hand, similar to STEP S7, it is acceptable not to lift nor lower the upper discharge tray 25 also at STEP S8.

Further, at STEPS S7 and S8, if the distance (D1, D2) between the upper discharge tray 25 and the lower discharge tray 37 is increased, it is acceptable to lower the upper discharge tray 25 by as much as a first distance and lower the lower discharge tray 37 by as much as a second distance which is larger than the first distance. In this case, it is suitable that a descending speed of the upper discharge tray 25 is smaller than a descending speed of the lower discharge tray 37.

Second Embodiment

Although a second embodiment will be described next, the configuration of the detection unit 102 and the movement of the sheet discharging apparatus 100 in the first embodiment are changed in the second embodiment. Therefore, configurations similar to the first embodiment will be described by omitting illustrations or putting the same reference characters on diagrams.

Control System

Figure 5:
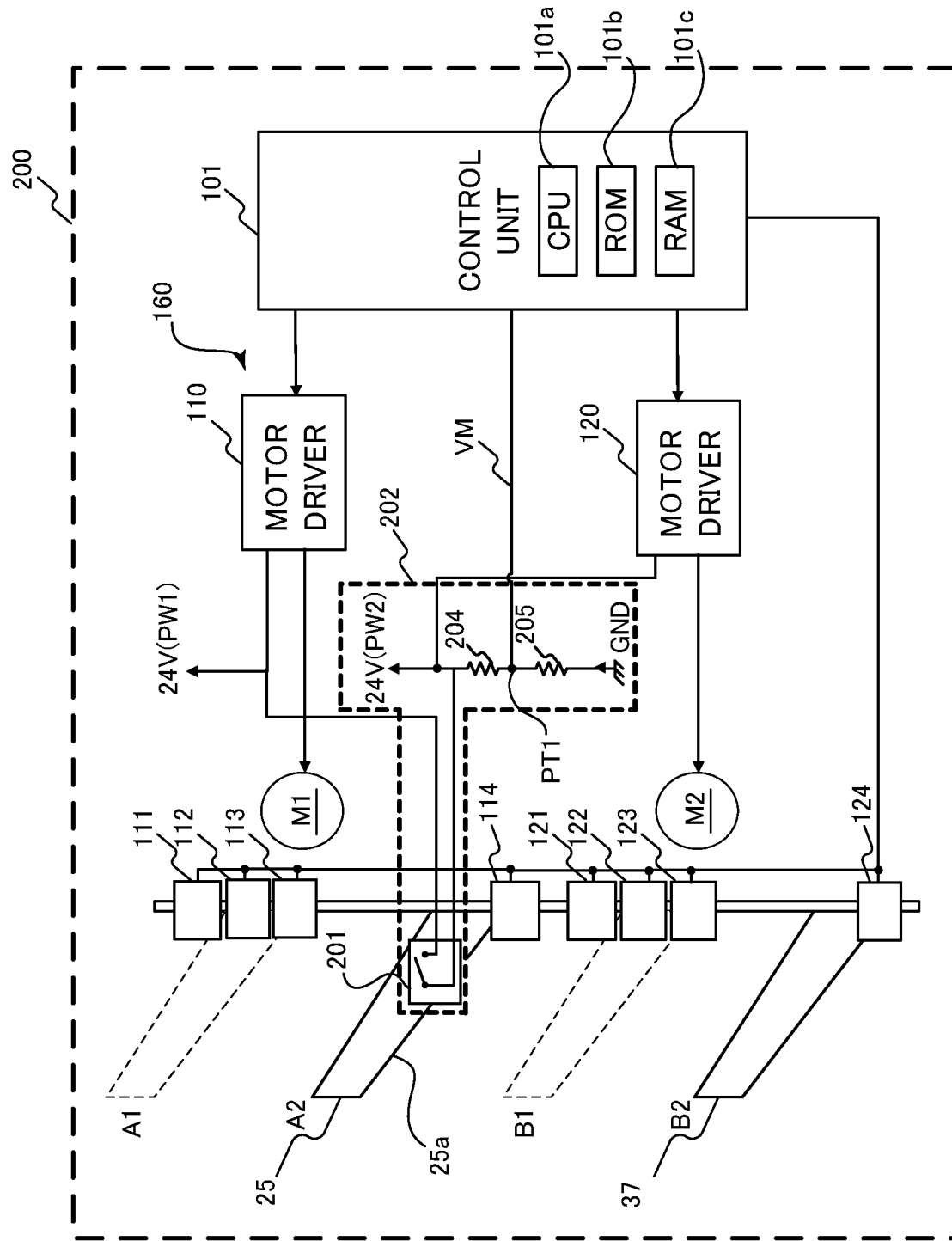
FIG. 5 is a block diagram showing a control system according to a second embodiment.

FIG. 5 is a block diagram showing a control system of a sheet discharging apparatus 200 of the sheet processing apparatus 4. The sheet discharging apparatus 200 includes a detection unit 202 which changes an output value based on the detection result of the contact of the sheet stacked on the lower discharge tray 37 with the lower surface 25a of the upper discharge tray 25, and the detection unit 202 includes a power source cut-off unit 201 and resistors 204 and 205.

The power source cut-off unit 201 is a component which consists of an interlock switch and is capable of cutting off a power source. The interlock switch is capable of being switched by a mechanical flag, not shown, between an ON state, which is a conducting state, and an OFF state, which is a non-conducting state, and the interlock switch and the mechanical flag are disposed on the lower surface 25a of the upper discharge tray 25.

In a state where the hand of the person or the sheet does not touch on the lower surface 25a of the upper discharge tray 25, contact points of the mechanical flag are connected, and the interlock switch becomes the ON state. In a state where the hand of the person or the sheet touches on the lower surface 25a of the upper discharge tray 25, the contact points of the mechanical flag are disconnected, and the interlock switch becomes the OFF state. To be noted, it is acceptable to configure the power source cut-off unit 201 using a photosensor and a relay in place of the interlock switch and the mechanical flag.

A first end of the power source cut-off unit 201 is coupled to a power source PW1 which is 24 V power source, and a second end is coupled to a power source PW2 which is another 24 V power source. In a case where the power source cut-off unit 201 is in the ON state, power is supplied to the power source PW2, and, in a case where the power source cut-off unit 201 is in the OFF state, the power is supplied to the power source PW1. That is, the power source cut-off unit 201 cuts off power supply to the motor driver 120 and the motor M2 in the OFF state.

Further, a first end of the resistor 204 is coupled to the power source cut-off unit 201, and a second end is coupled to the resistor 205. The resistor 205 is coupled to the ground (GND) on an opposite side of the resistor 204.

In a case where the power source cut-off unit 201 is in the ON state and 24 V power is supplied to the power source PW2, voltage is divided by the resistors 204 and 205, and voltage VM between a point PT1, which is a point between the resistors 204 and 205, and the control unit 101 becomes 3.3 V. On the other hand, in a case where the power source cut-off unit 201 is in the OFF state and 24 V power is not supplied to the power source PW2, the voltage VM becomes 0 V. Based on a switch of the voltage VM from 3.3 V to 0 V, the control unit 101 judges that the hand of the person or the sheet has come into contact with the lower surface 25a of the upper discharge tray 25.

Movement at Taking Out of Sheet

Next, movement of the sheet discharging apparatus 200 at a time when the sheet stacked on the lower discharge tray 37 has been taken out will be described. Although FIGS. 6A to 6E are diagrams showing movement of the upper discharge tray 25 and the lower discharge tray 37 at a time when the sheet bundle P2 is taken out from the lower discharge tray 37, since FIGS. 6A to 6C are similar to FIGS. 3A to 3C, descriptions of FIGS. 6A to 6C will be omitted.

Figure 7:
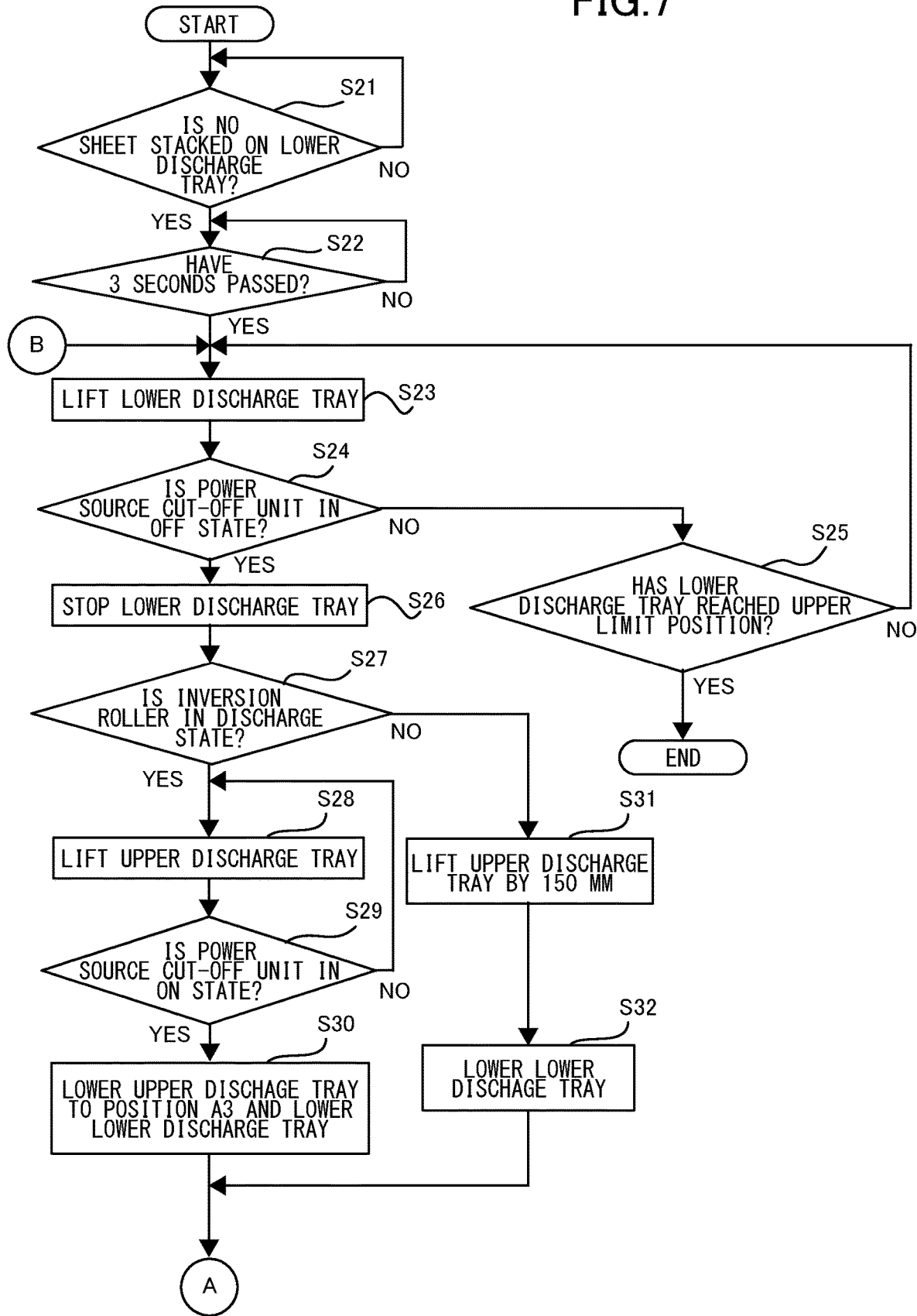
FIG. 7 is a flowchart showing processes performed at a time when the sheet bundle has been taken out from the lower discharge tray.
Figure 8:
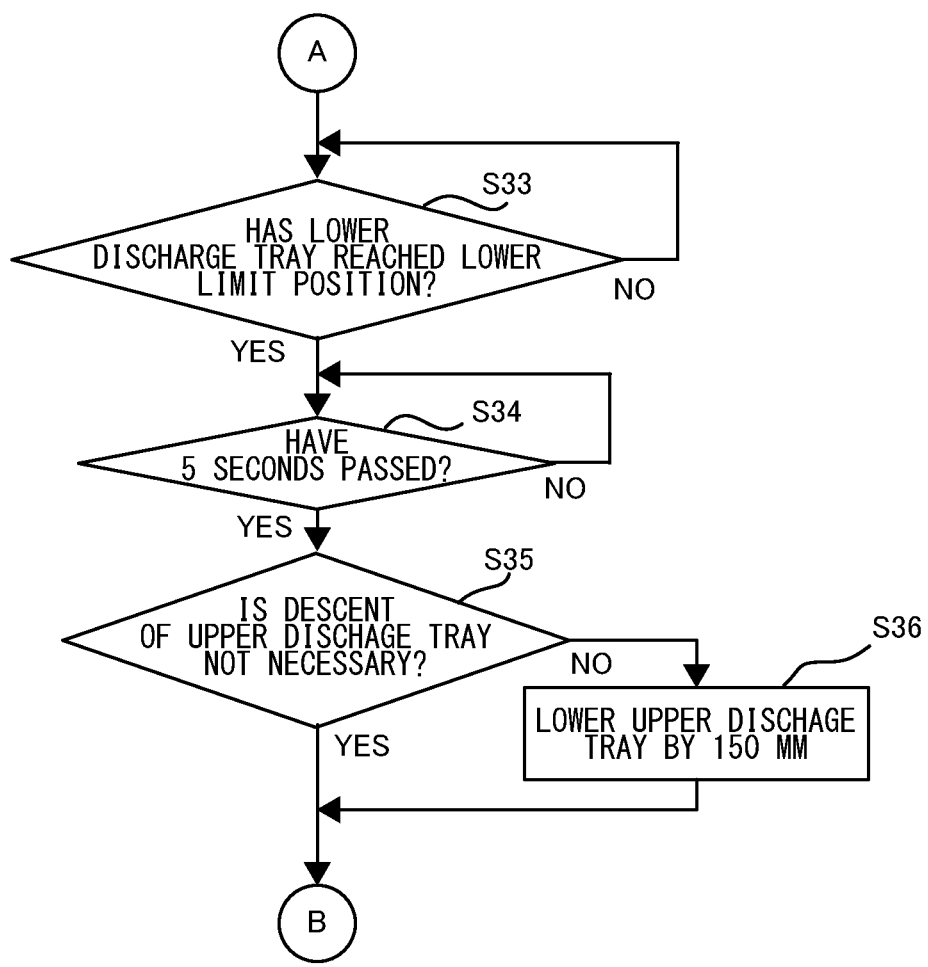
FIG. 8 is the flowchart showing the processes performed at a time when the sheet bundle has been taken out from the lower discharge tray.

Further, FIGS. 7 and 8 are flowcharts showing processes performed when the sheet bundle P2 has been taken out from the lower discharge tray 37. Hereinafter, the movement of the control unit 101 performed in a case where the sheet bundle stacked on the lower discharge tray 37 has been taken out from a state shown in FIG. 6A will be described along the flowcharts shown in FIGS. 7 and 8. To be noted, in the following description, the control unit 101 respectively controls the motors M1 and M2 to perform the ascent and descent of the upper discharge tray 25 and the lower discharge tray 37.

As shown FIG. 7, based on the detection results of the full stack sensor 122 and the sheet presence/absence detection sensor 123, the control unit 101 judges whether or not the sheet is stacked on the lower discharge tray 37 (STEP S21). For example, as shown in FIG. 6B, when the sheet bundle P2 on the lower discharge tray 37 is taken out, it is judged that the sheet is not stacked on the lower discharge tray 37.

In a case where it is judged that the sheet is not stacked on the lower discharge tray 37 (STEP S21: YES), the control unit 101 judges whether or not 3 seconds to securely take out the sheet bundle P2 have passed (STEP S22). To be noted, although, in this embodiment, 3 seconds are secured as the amount of the time to take out the sheet bundle P2, it is not limited to this, and it is acceptable to change the amount of the time to take out the sheet bundle.

In a case where 3 seconds have passed (STEP S22: YES), the control unit 101 regards that the sheet bundle P2 has been taken out from the lower discharge tray 37, and lifts the lower discharge tray 37 toward the upper limit position B1 (STEP S23). Then, the control unit 101 judges whether or not the power source cut-off unit 201 is in the OFF state (STEP S24). In a case where the power source cut-off unit 201 is in the ON state (STEP S24: NO), the control unit 101 judges whether or not the lower discharge tray 37 has reached the upper limit position B1 (STEP S25).

In a case where the lower discharge tray 37 is judged to have reached the upper limit position B1 (STEP S25: YES), the control unit 101 stops the lower discharge tray 37, and ends the processes. In a case where the lower discharge tray 37 is judged not to have reached the upper limit position B1 (STEP S25: NO), the control unit 101 returns to STEP S23.

As shown in FIG. 6C, in a case where the power source cut-off unit 201 is turned into the OFF state by the contact of the sheet bundle P2 with the lower surface 25a of the upper discharge tray 25 while the lower discharge tray 37 is being lifted (STEP S24: YES), the control unit 101 proceeds to STEP S26.

For example, as shown in FIGS. 6B and 6C, in a case where the sheet bundle P2 is still being stacked on the lower discharge tray 37 after having taken out the sheet bundle P2 by as much as the predetermined amount from the lower discharge tray 37, it is occurred that the sheet bundle P2 comes into contact with the lower surface 25a of the upper discharge tray 25. Further, it is occurred that the power source cut-off unit 201 is turned into the OFF state by the contact of the hand of the user, who holds the sheet bundle P2 intending to take out the sheet bundle P2 from the upper discharge tray 25, with the lower surface 25a.

To be noted, a position where the lower discharge tray 37 is positioned at a time when the power source cut-off unit 201 is turned into the OFF state is referred to as the contact position B4. When the power source cut-off unit 201 becomes the OFF state, a connection between the power source PW1 and the power source PW2 is disconnected, and voltage of the power source PW2 which was supplying the power to the motor driver 120 becomes 0 V. Herewith, the motor M2 stops, and the lower discharge tray 37 stops (STEP S26).

Next, the control unit 101 judges whether or not the inversion roller pair 24 is in the discharge state of discharging the sheet to the upper discharge tray 25 (STEP S27). In a case where the inversion roller pair 24 is in the discharge state (STEP S27: YES), the control unit 101 lifts the upper discharge tray 25 (STEP S28). Then, the control unit 101 judges whether or not the power source cut-off unit 201 becomes the ON state (STEP S29), and, in a case where the power source cut-off unit 201 is in the OFF state (STEP S29: NO), returns to STEP S28.

That is, at STEPS S28 and S29, a first ascending process of lifting the upper discharge tray 25 until the power source cut-off unit 201 becomes the ON state is performed. As shown in FIG. 6D, a position where the upper discharge tray 25 is positioned at a time when the power source cut-off unit 201 is turned into the ON state is referred to as a position A5. At the position A5, while it is difficult to stack the curled sheet discharged from the inversion roller pair 24 on the upper discharge tray 25, it is possible to stack a normal sheet satisfactorily.

In a case where the power source cut-off unit 201 becomes the ON state (STEP S29: YES), the control unit 101 stops the upper discharge tray 25, and lowers the upper discharge tray 25 from the position A5 to the position A3. At the same time, as shown in FIG. 6E, the control unit 101 performs a first descending process of lowering the lower discharge tray 37 toward the lower limit position B2 (STEP S30). In the first descending process, the upper discharge tray 25 is moved to a position prior to execution of the first ascending process described above (STEPS S28 and S29). At this time, a rotational speed of the motor M1 is set to be equal to or smaller than a rotational speed of the motor M2. That is, the descending speed of the upper discharge tray 25 is set to be smaller than the descending speed of the lower discharge tray 37.

Herewith, a distance D3 between the upper discharge tray 25 and the lower discharge tray 37 in the vertical direction VD is increased, and the space SP between the upper surface P2a of the sheet bundle P2 on the lower discharge tray 37 and the lower surface 25a of the upper discharge tray 25 is widened. Therefore, the user is able to put the hand into the space SP easily, and it is possible to facilitate the work to take out the sheet bundle P2 stacked on the lower discharge tray 37. Further, since the upper discharge tray 25 is lifted only to a distance required to turn the power source cut-off unit 201 into the ON state, the upper discharge tray 25 is not lifted largely. Therefore, the upper discharge tray 25 is able to stack the sheet discharged by the inversion roller pair 24 well, and keep a capability to stack the sheet satisfactorily.

On the other hand, in a case where the inversion roller pair 24 is in the non-discharge state (STEP S27: NO), a second ascending process of lifting the upper discharge tray 25 by as much as 150 mm is performed (STEP S31). Then, the control unit 101 performs second descending process of lowering the lower discharge tray 37 toward the lower limit position B2 (STEP S32).

Herewith, the distance between the upper discharge tray 25 and the lower discharge tray 37 in the vertical direction VD is increased, and the space SP between the upper surface P2a of the sheet bundle P2 on the lower discharge tray 37 and the lower surface 25a of the upper discharge tray 25 is widened larger. Therefore, the user is able to put the hand into the space SP easily, and it is possible to facilitate the work to take out the sheet bundle P2 stacked on the lower discharge tray 37.

When STEPS S30 and S32 are completed, as shown in FIG. 8, the control unit 101 proceeds to STEP S33, and judges whether or not the lower discharge tray 37 has reached the lower limit position B2 (STEP S33). In a case where the lower discharge tray 37 has reached the lower limit position B2 (STEP S33: YES), the control unit 101 judges whether or not 5 seconds to securely take out the sheet bundle P2 from the lower discharge tray 37 have passed (STEP S34). To be noted, although, in this embodiment, 5 seconds are secured at STEP S34 as the amount of the time to take out the sheet bundle P2, it is not limited to this, and it is acceptable to change the amount of the time to take out the sheet bundle.

In a case where 5 seconds have passed (STEP S34: YES), the control unit 101 judges whether or not the descent of the upper discharge tray 25 is necessary (STEP S35). In a case where the inversion roller pair 24 is in the discharge state, since the upper discharge tray 25 was returned to the position A3 at STEP S30, it is not necessary to lower the upper discharge tray 25. Therefore, in a case where STEPS S28 to S30 have been executed, the control unit 101 judges that the descent of the upper discharge tray 25 is not necessary (STEP S35: YES), and returns to STEP S23.

In a case where the inversion roller pair 24 is in the non-discharge state, since the upper discharge tray 25 is lifted by as much as 150 mm at STEP S30, the control unit 101 judges that the descent of the upper discharge tray 25 is necessary (STEP S35: NO), and proceeds to STEP S36. The control unit 101 lowers the upper discharge tray 25 by as much as 150 mm (STEP S36), and returns to STEP S23. That is, the control unit 101 moves the upper discharge tray 25 to a position prior to execution of the second ascending process at STEP S31.

As described above, in this embodiment, since, in a case where the power source cut-off unit 201 is turned into the OFF state by the contact of the sheet bundle P2 with the lower surface 25a of the upper discharge tray 25 while the lower discharge tray 37 is being lifted, the lower discharge tray 37 is mechanically stopped, and it is possible to prevent damage of the sheet processing apparatus 4.

Further, when the power source cut-off unit 201 becomes the OFF state, following control is performed. That is, in a case where the inversion roller pair 24 is in the discharge state, the upper discharge tray 25 is lifted to the distance required to turn the power source cut-off unit 201 into the ON state. In a case where the inversion roller pair 24 is in the non-discharge state, the upper discharge tray 25 is lifted by as much as 150 mm which are is adequate to turn the power source cut-off unit 201 into the ON state. Thereafter, the upper discharge tray 25 is returned to the position A3, and the lower discharge tray 37 is lowered to the lower limit position B2. In other words, so as to increase the distance D3 between the upper discharge tray 25 and the lower discharge tray 37, a separation process of moving at least one of the upper discharge tray 25 and the lower discharge tray 37 is performed. The separation process corresponds to STEPS S24 to S33 in FIGS. 7 and 8.

Herewith, the user is able to put the hand into the space SP easily, and it is possible to facilitate the work to take out the sheet bundle P2 or the sheet stacked on the lower discharge tray 37.

To be noted, although, in this embodiment, the upper discharge tray 25 is lifted by as much as 150 mm at STEP S31, it is not limited to this. For example, it is acceptable to lift the upper discharge tray 25 by an appropriate distance so as to position the upper discharge tray 25 above the position A3 and below the upper limit A1.

Third Embodiment

Although a third embodiment of this disclosure will be described next, the third embodiment is configured by adding a distance estimating unit 130 to the sheet discharging apparatus of the second embodiment. Therefore, the configurations similar to the second embodiment will be described by omitting illustrations or putting the same reference characters on diagrams.

Control System

Figure 9:
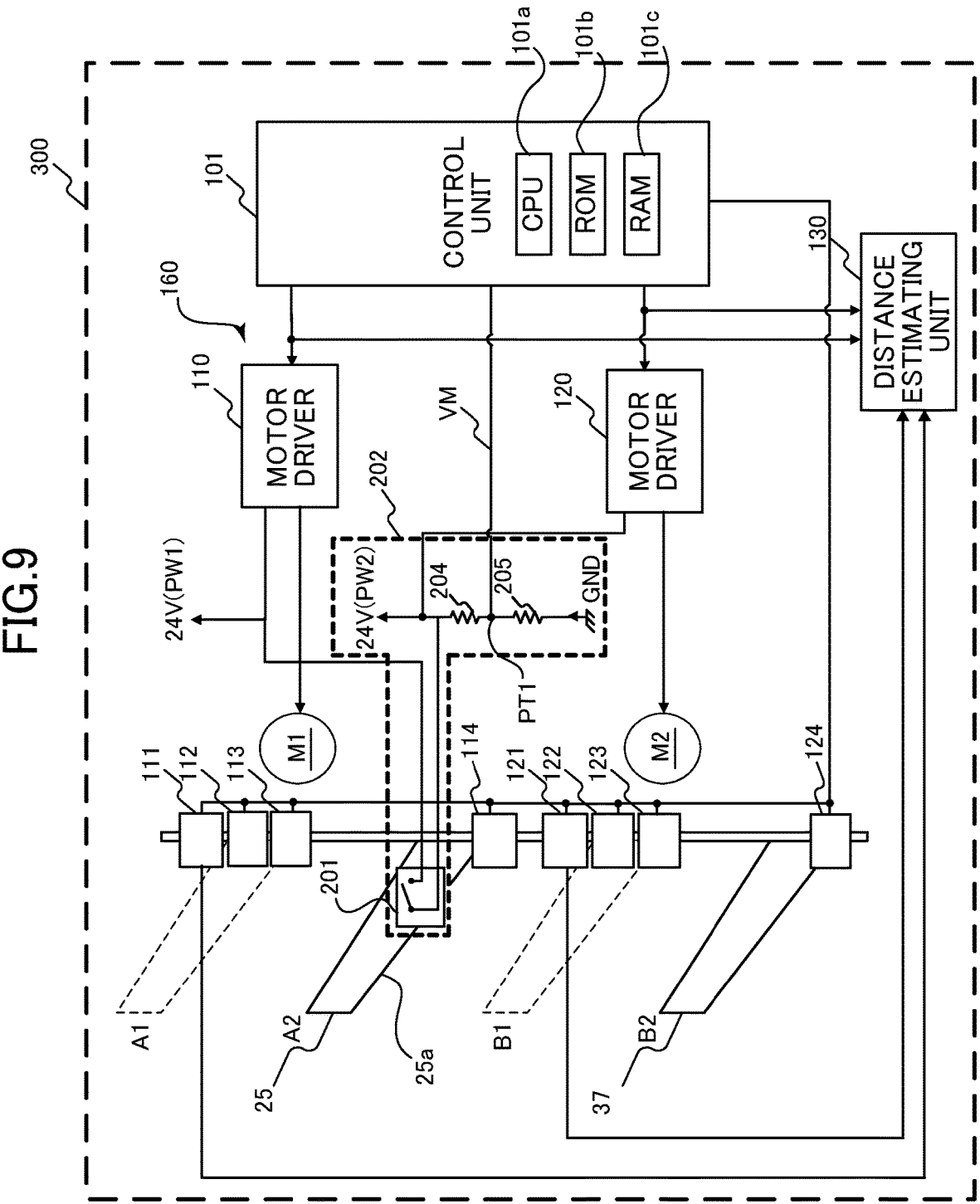
FIG. 9 is a block diagram showing a control system according to a third embodiment.

FIG. 9 is a block diagram showing a control system of a sheet discharging apparatus 300. The sheet discharging apparatus 300 includes the distance estimating unit 130 in addition to the configurations described in FIG. 5. The distance estimating unit 130 estimates a distance from the lower surface 25a of the upper discharge tray 25 to the sheet bundle stacked on the lower discharge tray 37 using the output values of the upper limit sensors 111 and 121 and the clock number transmitted from the control unit 101 to the motor drivers 110 and 120. A calculation method for an estimation of the distance (hereinafter referred to as an estimated distance Dx) from the lower surface 25a to the sheet bundle stacked on lower discharge tray 37 will be described later.

Movement at Taking Out of Sheet

Figures 10A, 10B, 10C:
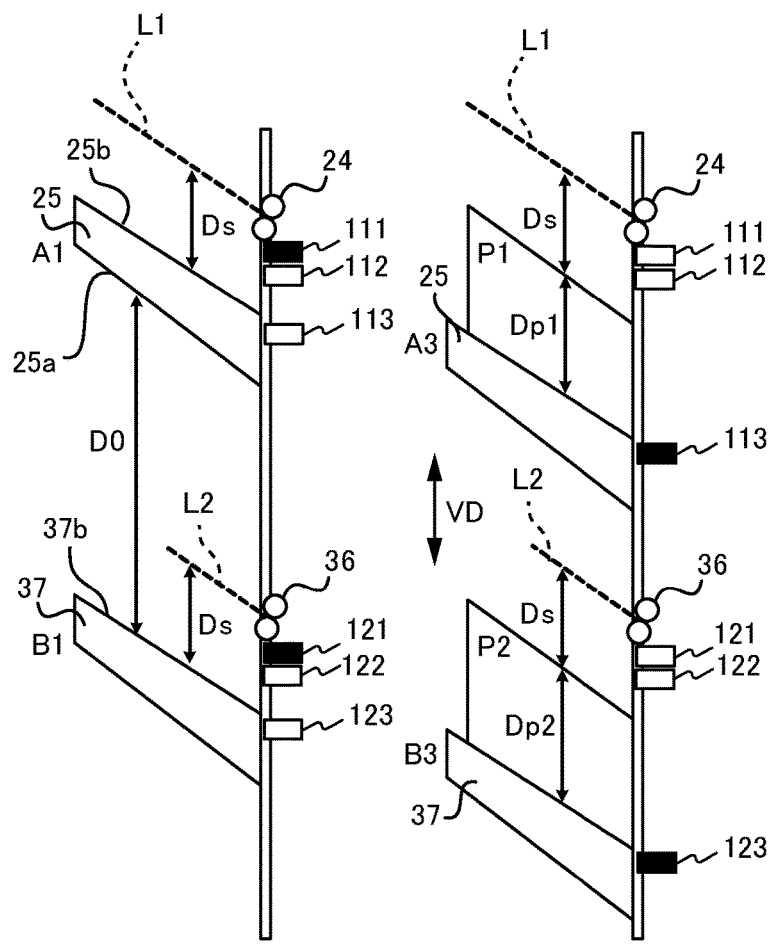
FIG. 10A is a diagram showing each tray positioned at an upper limit position.
FIG. 10B is a diagram showing a state where a predetermined amount of the sheet bundle is stacked on each tray.
FIG. 10C is a diagram showing a distance between the sheet bundle stacked on the lower discharge tray and the lower surface of the upper discharge tray.

Next, movement of the sheet discharging apparatus 300 at a time when the sheet stacked on the lower discharge tray 37 has been taken out will be described. FIG. 10A is a diagram showing a state where the sheet is not stacked on the upper discharge tray 25 and the lower discharge tray 37. At this time, the upper discharge tray 25 is positioned at the upper limit position A1, and the lower discharge tray 37 is positioned at the upper limit position B1.

To be noted, a distance from an upper surface 25b of the upper discharge tray 25 positioned at the upper limit position A1 to a height of a nip of the inversion roller pair 24 is referred to as a distance Ds in FIGS. 10A to 10C. Similarly, a distance from an upper surface 37b of the lower discharge tray 37 positioned at the upper limit position B1 to a height of a nip of the bundle discharge roller pair 36 is referred to as the distance Ds. Further, a line which passes through the nip of the inversion roller pair 24 and is parallel to the upper surface 25b of the upper discharge tray 25 is referred to as a line L1, and a line which passes through the nip of the bundle discharge roller pair 36 and is parallel to the upper surface 37b of the lower discharge tray 37 is referred to as a line L2. At this time, the distance Ds corresponds to a distance from the upper surface 25b of the upper discharge tray 25 to the line L1, or a distance from the upper surface 37b of the lower discharge tray 37 to the line L2.

Further, a distance from the upper surface 37b of the lower discharge tray 37 positioned at the upper limit position B1 to the lower surface 25a of the upper discharge tray 25 positioned at the upper limit position A1 is referred to as a distance D0. 400 mm is designated as the distance D0 in this embodiment.

As shown in FIG. 10B, for example, in a case where a predetermined amount of the sheet bundle P1 is stacked on the upper discharge tray 25, the upper discharge tray 25 is positioned at the position A3. Further, for example, in a case where a predetermined amount of the sheet bundle P2 is stacked on the lower discharge tray 37, the lower discharge tray 37 is positioned at the position B3. The upper discharge tray 25 and the lower discharge tray 37 are lifted and lowered in accordance with the positions of the upper surfaces of the sheet bundles detected by the full stack sensors 112 and 122, and the positions of the upper discharge tray 25 and the lower discharge tray 37 in the vertical direction VD are controlled. At this time, the upper discharge tray 25 is positioned, so that the distance from the upper surface of the sheet bundle P1 to the height of the nip of the inversion roller pair 24, namely to the line L1, becomes the distance Ds. Similarly, the lower discharge tray 37 is positioned, so that the distance from the upper surface of the sheet bundle P2 to the height of the nip of the bundle discharge roller pair 36, namely to the line L2, becomes the distance Ds.

Further, when the sheet bundle P1 is stacked, the upper discharge tray 25 descends as much as a distance Dp1 from the upper limit position A1 to the position A3. The distance Dp1 approximately corresponds to a height of the sheet bundle P1. Further, when the sheet bundle P2 is stacked, the lower discharge tray 37 descends as much as a distance Dp2 from the upper limit position B1 to the position B3. The distance Dp2 approximately corresponds to a height of the sheet bundle P2. Even in a case where a curled sheet is discharged from the inversion roller pair 24, the upper discharge tray 25 is capable of stacking the sheet at the position A3. Even in a case where the curled sheet is discharged from the bundle discharge roller pair 36, the lower discharge tray 37 is capable of stacking the sheet at the position B3.

The distances Dp1 and Dp2 are calculated from the clock number which the control unit 101 transmits to the motor drivers 110 and 120 so as to lower each of the discharge trays from the upper limit positions A1 and B1 to the positions A3 and B3, and, in this calculation, the positions at which the upper limit sensors 111 and 121 indicate the upper limit positions are referred to as 0 mm. For example, assume a case where a descending amount of the upper discharge tray 25 per clock is 0.05 mm and the control unit 101 transmits 4000 clocks to lower the upper discharge tray 25 from the upper limit position A1 to the position A3. In this case, the distance Dp1 of the descending amount of the upper discharge tray 25 is calculated as 0.05 multiplied by 4000 equals 200 mm.

Hereinafter, movement of the control unit performed in a case where the sheet bundle stacked on the lower discharge tray 37 has been taken out from a state shown in FIG. 10B, will be described along flowcharts shown in FIGS. 11 and 12. To be noted, in the following descriptions, the control unit 101 controls each of the motors M1 and M2, and performs the ascent and descent of the upper discharge tray 25 and the lower discharge tray 37.

Figure 11:
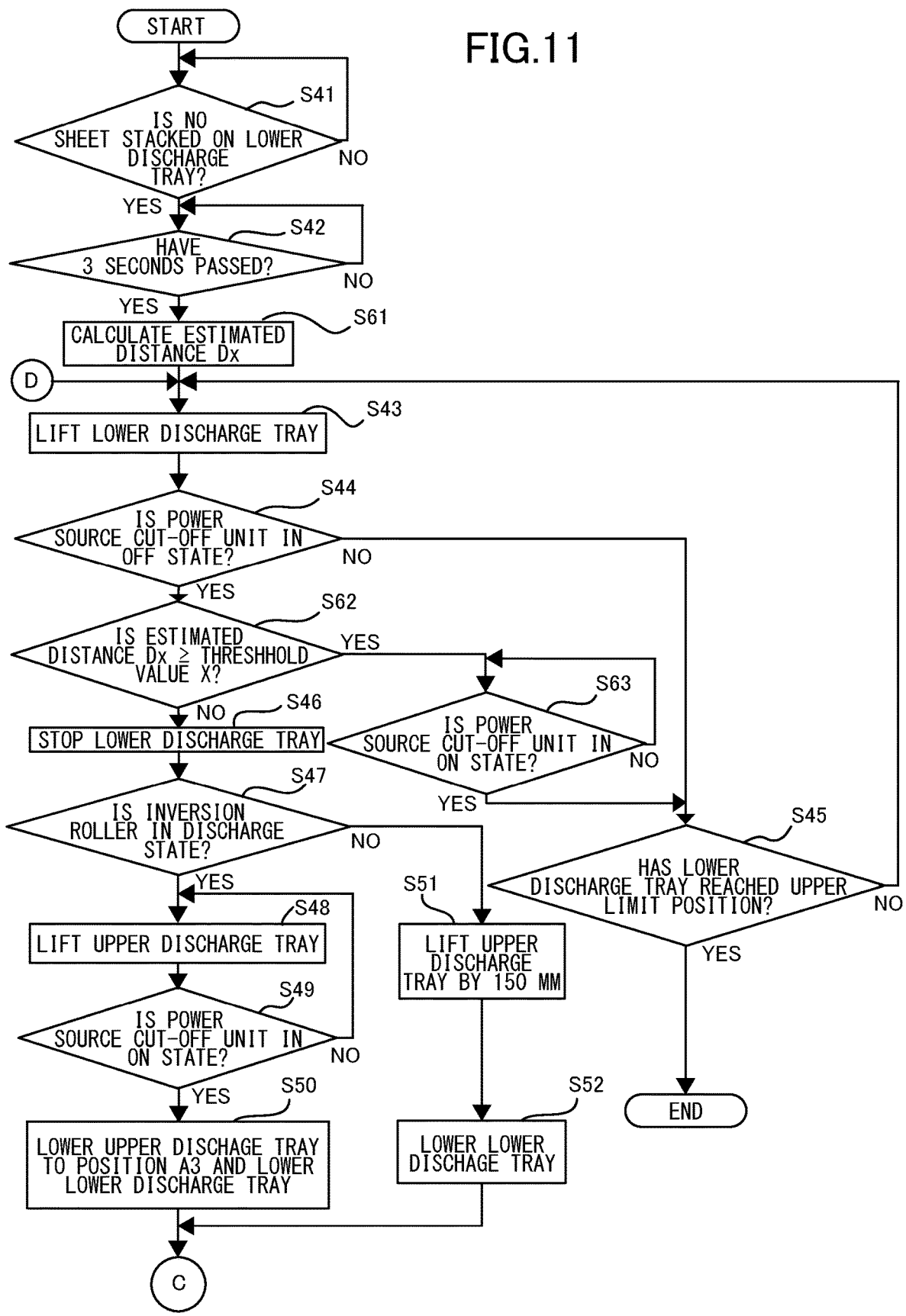
FIG. 11 is a flowchart showing processes performed at a time when the sheet bundle has been taken out from the lower discharge tray.
Figure 12:
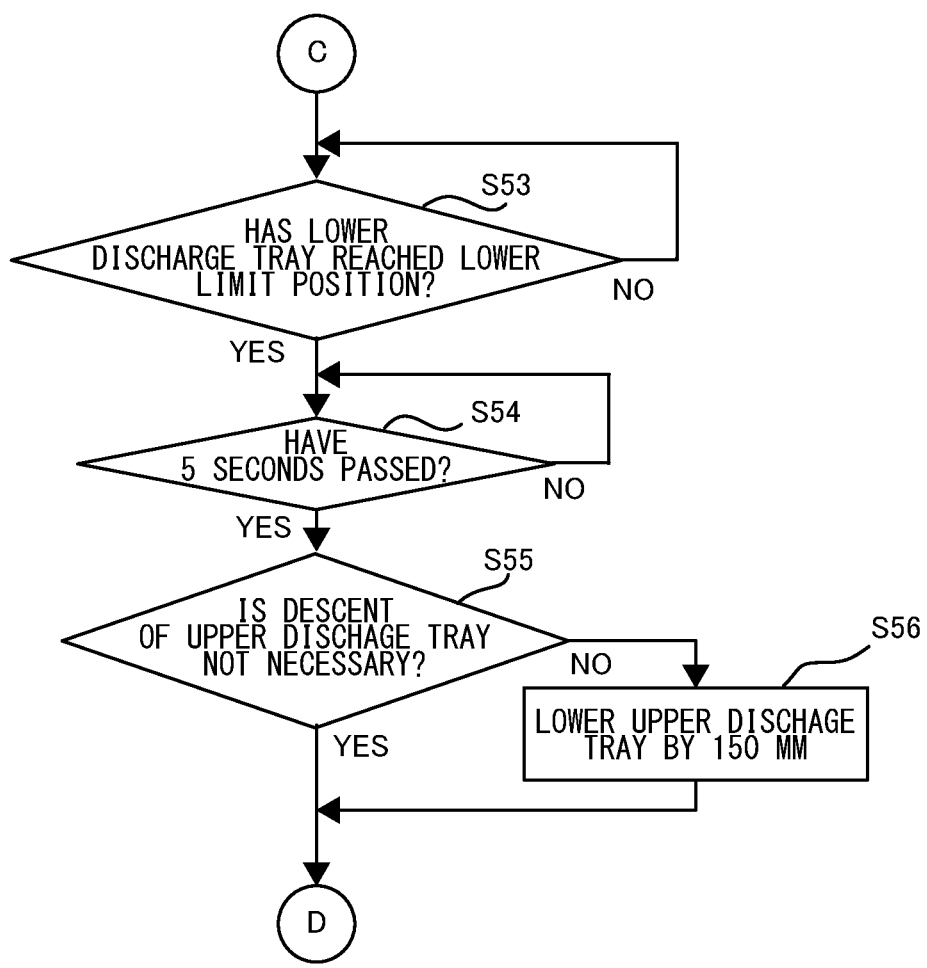
FIG. 12 is a flowchart showing the processes performed at the time when the sheet bundle has been taken out from the lower discharge tray.

Further, since STEPS S41 to S56 shown in FIGS. 11 and 12 are similar to STEPS S21 to S36 shown in FIGS. 7 and 8, descriptions of STEPS S41 to S56 will be omitted, and STEPS S61 to S63 will be primarily described.

In a case where 3 seconds have passed at STEP S42 (STEP S42: YES), the control unit 101 regards that the sheet bundle P2 has been taken out from the lower discharge tray 37, and calculates the estimated distance Dx shown in FIG. 10C (STEP S61). The estimated distance Dx, in a case where the sheet bundle P2 has not been taken out from the lower discharge tray 37, is a distance from the upper surface of the sheet bundle P2 stacked on the lower discharge tray 37 positioned at the upper limit position B1 to the lower surface 25a of the upper discharge tray 25. That is, the estimated distance Dx, in a case where the lower discharge tray 37 ascends from the position B3 to the upper limit position B1, indicates a size of the space SP (refer to FIG. 10C) between the upper surface of the sheet bundle P2 stacked on the lower discharge tray 37 and the lower surface 25a of the upper discharge tray 25.

The estimated distance Dx is calculated by the distance estimating unit 130 (refer to FIG. 9) in accordance with an equation described below:

$$Dx = D0 - Dp1 - Dp2 \qquad \text{[Equation 1]}$$

To be noted, although the estimated distance Dx becomes a minus value in some cases, it is preferred that the positions of the upper discharge tray 25 and the lower discharge tray 37, and a maximum loading amount of the sheet bundle P2 are set, so that the estimated distance Dx does not become the minus value. Herewith, it is possible to contain a collision of the sheet bundle P2 with the lower surface 25a of the upper discharge tray 25, and reduce a damage of the sheet processing apparatus 4.

Then, the control unit 101 lifts the lower discharge tray 37 toward the upper limit position B1 (STEP S43). Next, the control unit 101 judges whether or not the power source cut-off unit 201 is in the OFF state (STEP S44). At this point, what is assumed in the case where the power source cut-off unit 201 is turned into the OFF state is that the hand of the person or the matter other than the sheet bundle P2 comes into contact with the lower surface 25a of the upper discharge tray 25 while the lower discharge tray 37 is being lifted.

In a case where the power source cut-off unit 201 is in the OFF state (STEP S44: YES), the lower discharge tray 37 is automatically mechanically stopped as described above. Then, the control unit 101 judges whether or not the estimated distance Dx is equal to or larger than a threshold value X (Dx≥X) (STEP S62). The threshold value X is a distance from the upper surface of the sheet bundle P2 to the lower surface 25a of the upper discharge tray 25, and corresponds to the size of the space SP to be secured for taking out the sheet bundle P2. In this embodiment, the threshold value X is set, for example, at 150 mm.

In a case where the estimated distance Dx is smaller than the threshold value X (STEP S62: NO), the control unit 101 judges whether or not the inversion roller pair 24 is in the discharge state of discharging the sheet to the upper discharge tray 25 (STEP S47) while stopping the lower discharge tray 37 (STEP S46). Although the movement after STEP S47 is similar to the second embodiment and descriptions will be omitted herein, the control unit 101 lifts the upper discharge tray 25 so as to secure the space SP for taking out the sheet bundle P2 (STEPS S48 and S51).

On the other hand, in a case where the estimated distance Dx is equal to or larger than the threshold value X (STEP S62: YES), the control unit 101 waits until the power source cut-off unit 201 turns into the ON state (STEP S63). Turning of the power source cut-off unit 201 into the ON state at STEP S63 means that the hand of the person or the like has been separated from the lower surface 25a of the upper discharge tray 25.

In a case where the power source cut-off unit 201 turns into the ON state (STEP S63: YES), the control unit 101 continues to lift the lower discharge tray 37, and judges whether or not the lower discharge tray 37 has reached the upper limit position B1 (STEP S45). In a case where the control unit 101 judges that the lower discharge tray 37 has reached the upper limit position B1 (STEP S45: YES), the control unit 101 stops the lower discharge tray 37 and ends the processes. In a case where the control unit 101 judges that the lower discharge tray 37 has not reached the upper limit position B1 (STEP S45: NO), the control unit 101 returns to STEP S43.

Further, the control unit 101 is capable of performing a first mode to carry out a separation process of moving at least one of the upper discharge tray 25 and the lower discharge tray 37, and a second mode not to carry out the separation process and not to lift nor lower the upper discharge tray 25. The separation process includes a first ascending process (STEPS S48 and S49) and a second ascending process (STEP S51) of lifting the upper discharge tray 25, and corresponds to STEPS S46 to S53 in FIGS. 11 and 12. The first mode corresponds to STEPS S46 to S56 in FIGS. 11 and 12, and the second mode corresponds to STEPS S63 and S45.

As described above, in this embodiment, the upper discharge tray 25 is lifted only in the case where the estimated distance Dx is judged to be smaller than the threshold value X at STEP S62 (STEP S62: NO). By lifting the upper discharge tray 25, it is possible to secure the space SP for taking out the sheet bundle P2 stacked on the lower discharge tray 37. Herewith, the user is able to put the hand into the space SP easily, and it is possible to facilitate the work to take out the sheet bundle P2 stacked on the lower discharge tray 37.

Further, in the case where the estimated distance Dx is judged to be equal to or larger than the threshold value X at STEP S62 (STEP S62: YES), the upper discharge tray 25 is not lifted. Therefore, it is possible to stack the sheet discharged by the inversion roller pair 24 on the upper discharge tray 25 well, and keep the capability to stack the sheet satisfactorily. For example, even in the case where the curled sheet is discharged from the inversion roller pair 24, the upper discharge tray 25 is capable of stacking the sheet satisfactorily.

To be noted, although, in this embodiment, the estimated distance Dx is calculated by the distance estimating unit 130, it is acceptable that the distance estimating unit 130 is a part of the control unit 101 provided in the sheet discharging apparatus 300. Further, it is acceptable that the distance estimating unit 130 is included in a control unit, which is independent from the control unit 101, of the image forming apparatus 1 or the image reading apparatus 2, or included in an external computer and the like of the image forming system 1S.

Alternatives to Embodiments

Further, in any of the embodiments described above, the configuration of the detection unit (102, 202) is not limited, and, for example, it is acceptable to apply the power source cut-off unit 201 to the first embodiment, and apply the switch 103 to the second embodiment. Further, the separation process of moving at least one of the upper discharge tray 25 and the lower discharge tray 37 at a time when the matter such as the sheet and the hand comes into contact with the lower discharge tray 37 is not limited to the configurations described above. For example, it is acceptable to perform the separation process of the second and third embodiments, namely the processes of STEPS S27 to S32 shown in FIG. 7 or the processes of STEPS S47 to S52 shown in FIG. 11, in the first embodiment. Further, it is acceptable to perform the separation process of the first embodiment, namely STEPS S6 to S12, in the second and third embodiments.

Further, although, in any of the embodiments described above, the sheet is discharged to the upper discharge tray 25 by the inversion roller pair 24 which is capable of inverting the sheet and conveying the sheet to either the receiving path 81 or the internal discharge path 82, it is not limited to this. For example, it is acceptable to provide a roller pair downstream of the inversion roller pair 24 additionally, and discharge the sheet to the upper discharge tray 25 by the roller pair.

Further, although, in any of the embodiments described above, the sheet is discharged to the lower discharge tray 37 by the bundle discharge roller pair 36, it is not limited to this. For example, it is acceptable to discharge the sheet to the lower discharge tray 37 by the bundle discharge guide 34.

It is possible to put into practice this disclosure by supplying a program, which is capable of putting into practice equal to or more than one capability of the embodiments described above, to a system or an apparatus via a network or a storage medium, and by performing the process with retrieving the program using equal to or more than one processor provided in the system or a computer of the apparatus. Further, it is also possible to put into practice this disclosure by a circuit, such as an application-specific integrated circuit (ASIC), which puts into practice equal to or more than one capability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-042346, filed Mar. 11, 2020, which is hereby incorporated by reference herein in its entirety.

What is claimed is:

1. A sheet discharging apparatus comprising:
a first discharge unit and a second discharge unit configured to discharge a sheet respectively;
a first stacking unit configured to stack the sheet discharged by the first discharge unit;
a second stacking unit disposed below the first stacking unit, and configured to stack the sheet discharged by the second discharge unit;
a lifting unit configured to lift and lower the first and second stacking units;
a detection unit configured to change an output value based on contact of a matter with a lower surface of the first stacking unit;
a distance estimation unit configured to estimate a distance between the first stacking unit and the second stacking unit; and
a control unit configured to perform a separation process of lifting the first stacking unit so as to increase a distance between the first and second stacking units in a vertical direction in a case where the output value of the detection unit has changed based on contact of the matter with the lower surface of the first stacking unit and the distance estimated by the distance estimation unit being smaller than a threshold value.

2. The sheet discharging apparatus according to claim 1, wherein, in the separation process, the control unit is configured to perform a first ascending process of lifting the first stacking unit until the sheet stacked on the second stacking unit is separated from the lower surface of the first stacking unit in a case where the first discharge unit is in a discharge state of discharging the sheet.

3. The sheet discharging apparatus according to claim 2, wherein the second stacking unit is configured to ascend and descend between an upper position and a lower position which is below the upper position, the upper position being a position where the second stacking unit, with no sheet being stacked, is capable of stacking the sheet discharged from the second discharge unit, and
wherein, in the separation process, after the first ascending process has been performed, the control unit is configured to perform a first descending process of moving the first stacking unit to a position prior to an execution of the first ascending process and of moving the second stacking unit to the lower position.

4. The sheet discharging apparatus according to claim 3, wherein, after the second stacking unit has reached the lower position by the first descending process, the control unit is configured to move the second stacking unit to the upper position.

5. The sheet discharging apparatus according to claim 1, wherein, in the separation process, the control unit is configured to perform a second ascending process of lifting the first stacking unit by a predetermined distance in a case where the first discharge unit is in a non-discharge state of not discharging the sheet.

6. The sheet discharging apparatus according to claim 5, wherein the second stacking unit is configured to ascend and descend between an upper position and a lower position which is below the upper position, the upper position being a position where the second stacking unit, with no sheet being stacked, is capable of stacking the sheet discharged from the second discharge unit, and
wherein, in the separation process, after the second ascending process has been performed, the control unit is configured to perform a second descending process of moving the second stacking unit to the lower position.

7. The sheet discharging apparatus according to claim 6, wherein, after the second stacking unit has reached the lower position by the second descending process, the control unit is configured to move the second stacking unit to the upper position and move the first stacking unit to a position prior to an execution of the second ascending process.

8. The sheet discharging apparatus according to claim 1, wherein the lifting unit comprises a first driving source which lifts and lowers the first stacking unit, and a second driving source which lifts and lowers the second stacking unit, and
wherein the detection unit comprises a power source cut-off unit configured to cut off a power supply to the second driving source based on the contact of the matter with the lower surface.

9. The sheet discharging apparatus according to claim 1, wherein the matter comprises the sheet stacked on the second stacking unit.

10. The sheet discharging apparatus according to claim 1, wherein the threshold value comprises 150 mm.

11. A sheet processing apparatus comprising:
the sheet discharging apparatus according to claim 1; and
a sheet processing unit configured to process the sheet discharged by the sheet discharging apparatus.

12. The sheet processing apparatus according to claim 11, further comprising:
a first conveyance path configured to receive the sheet;
a second conveyance path disposed below the first conveyance path, and configured to receive the sheet from the first conveyance path and guide the sheet in a direction opposite to a direction in which the sheet is guided in the first conveyance path;
a third stacking unit configured to stack the sheet discharged from the second conveyance path;

a third conveyance path extending toward the second discharge unit from the third stacking unit, and configured to guide the sheet to the second discharge unit; and a rotary member pair disposed on the second conveyance path, and configured to discharge the sheet to the third stacking unit.

13. An image forming system comprising:

an image forming apparatus configured to form an image on a sheet; and the sheet processing apparatus according to claim 12 configured to receive the sheet from the image forming apparatus.

14. The sheet discharging apparatus according to claim 1, further comprising a first position sensor configured to detect a position of the first stacking unit in the vertical direction.

15. The sheet discharging apparatus according to claim 14, further comprising a second position sensor configured to detect a position of the second stacking unit in the vertical direction.

16. The sheet discharging apparatus according to claim 15, wherein the distance estimation unit estimates the distance between the first stacking unit and the second stacking unit based on a detection result of the first position sensor and a detection result of the second position sensor.

* * * * *